United States Patent [19]

Jaffe

[11] Patent Number: 4,548,968
[45] Date of Patent: * Oct. 22, 1985

[54] MANUFACTURE OF RESIN EXTENDED PIGMENTS

[75] Inventor: Edward E. Jaffe, Wilmington, Del.

[73] Assignee: Ciba Geigy Corporation, Ardsley, N.Y.

[ * ] Notice: The portion of the term of this patent subsequent to Oct. 23, 2001 has been disclaimed.

[21] Appl. No.: 624,176

[22] Filed: Jun. 1, 1984

Related U.S. Application Data

[63] Continuation-in-part of Ser. No. 482,596, Apr. 6, 1983, Pat. No. 4,478,968.

[51] Int. Cl.$^4$ .......................... C08K 5/34; C08K 5/56; C09J 3/20; C09C 3/10
[52] U.S. Cl. .................................... 524/88; 524/90; 524/562; 524/563; 524/564; 524/574; 524/581; 106/288 Q; 106/308 M; 106/308 Q; 106/309
[58] Field of Search ................... 524/88, 90, 562, 563, 524/564, 574, 581; 106/288 Q, 308 M, 308 Q, 309

[56] References Cited

U.S. PATENT DOCUMENTS

| 2,539,429 | 1/1951 | Jensen | 106/262 |
|---|---|---|---|
| 2,544,636 | 3/1951 | Peck | 524/407 |
| 2,649,382 | 8/1953 | Vesce | 106/193 |
| 3,705,816 | 12/1972 | Zwahlen | 106/308 |
| 3,806,464 | 4/1974 | Matrick et al. | 252/316 |
| 3,925,096 | 12/1975 | Karkov | 106/309 |
| 4,158,572 | 6/1979 | Blackburn et al. | 106/309 |
| 4,260,424 | 4/1981 | Mizoguchi et al. | 106/305 |
| 4,369,272 | 1/1983 | Jaffe | 106/309 |
| 4,371,642 | 2/1983 | Jaffe | 524/88 |
| 4,371,643 | 2/1983 | Thomas | 524/88 |
| 4,404,036 | 9/1983 | Donegan | 106/309 |
| 4,478,968 | 10/1984 | Jaffe | 524/88 |

FOREIGN PATENT DOCUMENTS

| 554960 | 3/1958 | Canada . |
| 895751 | 5/1962 | United Kingdom . |
| 1431636 | 4/1976 | United Kingdom . |
| 2046770 | 11/1980 | United Kingdom . |
| 2051108 | 1/1981 | United Kingdom . |

Primary Examiner—Herbert J. Lilling
Attorney, Agent, or Firm—Harry Falber

[57] ABSTRACT

A process for preparing a resin extended pigment from crude pigment is disclosed. The process involves dry premilling the crude pigment with the resin followed by comilling the pre-milled pigment with the resin in the presence of water under alkaline conditions.

9 Claims, No Drawings

MANUFACTURE OF RESIN EXTENDED PIGMENTS

CROSS REFERENCE TO RELATED APPLICATION

This application is a continuation-in-part of Ser. No. 482,596 filed April 6, 1983, now U.S. Pat. No. 4,478,968.

BACKGROUND OF THE INVENTION

1. Field of the Invention

The present invention relates to a process for the production of resin extended pigments which exhibit improved dispersiblity over the corresponding nonresin extended pigment in a variety of plastics applications.

Pigments are widely used in various types of polymeric media. The efficiency of a pigment as a color imparting substance is very dependent on the degree of pigment dispersion achieved in these media. Generally pigments are products having a very small particle size with a consequent tendency to form aggregates during their preparation. This tendency to form aggregates is particularly troublesome during the drying step used in the preparation of pigments. In order to overcome this tendency to form aggregates various methods have been used to prevent or minimize the formation of aggregates and thus enhance dispersibility of the pigment involved.

2. Prior Art

U.S. Pat. No. 2,539,429 discloses comilling a pigment and a water insoluble resin in the presence of a water miscible solvent for the resin. The solvent is then removed with water.

U.S. Pat. No. 2,544,636 discloses comilling a pigment and a resin in the presence of a solvent for the resin to produce a free flowing pigment base.

U.S. Pat. No. 2,649,382 discloses a process wherein a pigment and a soluble resin are comilled with a mixture of water and a water miscible solvent for the resin.

U.S. Pat. No. 3,705,816 discloses grinding a pigment, a cellulose ester and a water miscible organic solvent for the cellulose ester.

U.S. Pat. No. 3,806,464 discloses a process for preparing a pigment encapsulated with an acrylic interpolymer by comilling the pigment, the acrylic interpolymer and a solvent for the acrylic interpolymer. After the comilling step, the solvent is removed.

U.S. Pat. No. 3,925,096 discloses a process for producing a particulate resin-containing pigment composition in which an organic solvent soluble resin and pigment are comilled in the presence of an organic solvent.

British Pat. No. 895,751 discloses a process for forming a pigment preparation wherein a pigment is milled with a solution of a polymerization or polycondensation product followed by precipitation of the polymerization or polycondensation product.

British Pat. No. 1,431,636 discloses ball milling a pigment with a solution of a polyester-polyurethane to form a pigment paste.

Canadian Pat. No. 554,960 discloses milling a pigment and a plastic in the presence of water, a water miscible solvent for the plastic and a water immiscible solvent for the plastic.

SUMMARY OF THE INVENTION

In the process of the present invention a resin extended pigment having improved dispersibility and having the pigment particles reduced to pigmentary size is prepared by dry ball milling the crude pigment and resin followed by milling the resulting material, i.e., mill powder in water having a pH of 7 to 14 and preferably 9–13.5.

DETAILED DESCRIPTION

The present invention is a process for the production of resin extended pigments of improved dispersibility, which process is characterized by requiring no additional steps beyond those already employed in the process of particle size reduction for a given pigment. The desired resin is simply incorporated with the pigment in a dry premilling particle size reduction step, which is then followed with a milling step in basified water.

If the pigment is premilled in the presence of a resin and an intimate mixture is obtained, further milling in aqueous base is sufficient to obtain a product of excellent dispersibility characteristics in some systems such as polyvinyl chloride.

Comilling 30 g quinacridone, 20 g 4,11-dichloroquinacridone, 33.3 g copolymer and 8 g sodium sulfate, followed by milling in dilute aqueous base, produced a scarlet resin extended pigment of outstanding dispersibility in polyvinyl chloride. Many pigments, including quinacridones and copper phthalocyanines, extended with resin, of excellent plastics dispersibility, can be prepared by these procedures.

The products are highly dispersible quinacridone or copper phthalocyanine pigments which are essentially equal in dispersibility and pigmentary strength to commercial resin extended pigments, which have been resin extended in a separate step after having their particle size reduced to pigmentary size.

The relative proportions of pigment and resin may vary widely depending on the intended use of the resin extended pigment. As little as 10% by weight resin, based on the resin extended pigment, has shown a distinct beneficial effect for some pigments in some plastic systems. For the solid solution of 90% 2,9-dimethylquinacridone and 10% quinacridone, extension with 25% by weight resin, has given a product of vastly improved dispersibility in polyvinyl chloride, over a product containing no resin extension. In the case of a semichlorinated copper phthalocyanine, 50% by weight, based on the resin extended pigment, has shown the greatest effect in terms of dispersibility and compares very favorably with commercial resin extended pigments prepared by more elaborate processes. In terms of convenience and cost, the amount of resin used should be minimized; but the overriding consideration is dispersibility which is maximized in general at a resin extension in the range of 10–75% by weight based on the resin extended pigment and preferably from 25–50% by weight, based on the resin extended pigment.

A wide variety of resins can be used in the process. Generally the resin should not melt during the premilling operation which is carried out at temperatures as high as 65° C. In the aqueous milling step the temperature is usually 20°–50° C. Thus, preferably the resin should have a softening point above 75° C. The resin should be thermoplastic. The resin must be stable in the dilute aqueous acid which is used to remove any metal which becomes incorporated in the resin extended pigment during the milling operation. Adequate stability in dilute acid means that the resin does not undergo significant deleterious degradation when subjected to about a 1.5% solution of sulfuric acid at 90° C. for 2 hours. Any of a wide variety of resins can be used. The resin should be in a finely divided state such as a powder rather than being in the form of molding pellets.

The preferred resins generally are copolymers, such as an ethylene-acrylic acid copolymer, or ethylene homopolymer which are very compatible with many plastic systems.

The most preferred resins are low molecular polymers of ethylene which may contain up to 25% by weight of a monomer selected from the class consisting of acrylic acid, methacrylic acid, vinyl acetate and oxidized ethylene units. These preferred resins have softening points as determined by ASTM E-28 of 80°–140° C.

Premilling, as used in this invention, means milling in the complete absence of liquids or, if liquids are used, such as a phase directing solvent or a surface-active agent, they are present in such small amounts or of such a nature that the pigment and resin retain the characteristics of a powder.

The conditions applicable to the premilling operation are not especially critical. The mill loading is substantially conventional for ball milling operations. Thus, it is conventional for the charge of grinding media to occupy about half of the volume of the mill and for the material being ground to essentially occupy the voids between these media. It is quite possible to increase the charge with some increase in the milling time. The choice of these conditions is well within the skill of one versed in this type of operation. The preferred grinding media in the mills are the rod type, but these may vary in size, and it is quite possible to use ordinary round steel balls varying from ⅛ inch in diameter up to ½ inch in diameter or more in the operation. The aqueous milling is preferably carried out with ⅛ inch shot and a basic pH, to avoid having acid attack the metal milling media and thus generate hydrogen in the milling operation. The preferred aqueous bases are the alkali metal hydroxides with sodium hydroxide and potassium hydroxide being especially preferred. Alternatively, the aqueous milling can be carried out in a basified aqueous salt solution such as a solution of sodium sulfate or sodium chloride which has been rendered basic by addition of some sodium hydroxide. Alternatively, the aqueous milling can be carried out in a basic salt solution, such as a solution of $Na_2HPO_4$ or $Na_3PO_4$.

It is impossible to set up limits as to the length of the premilling or milling cycle in the presence of dilute base since both will vary depending upon the pigment being treated, the milling loading and the type of mill being used. In order to establish the optimum length of time for milling a particular pigment under a given set of conditions, it is recommended that the invention be run with variations in both milling times and loadings, and that samples of the finished product be evaluated for the best balance of properties, such as dispersibility, color strength and intensity. In a commercial scale mill 5–25 hours is usually required for each milling step. The times required in laboratory scale or semi-works are longer.

The preferred method of both premilling and aqueous milling is ball milling. However, any milling or grinding method which utilized an attrition and shearing action may be used. Such attrition and shearing action may be accomplished in rod mills, stirred and vibratory types of ball mills, and the like.

The preparation of resin extended or resin encapsulated pigment can also be carried out by premilling the pigment and resin in the presence of a small amount of an inorganic salt such as sodium sulfate or alum to suppress potential explosivity of the resulting powder. This is not essential since the powder particles are highly aggregated and not very dusty.

After the premilling step, the resulting mill powder is milled in the presence of basified water. This milling is done in the same types of ball mills which were used for the premilling step, but preferably one which uses ⅛ inch shot which occupy about ½ of the total mill volume and provision for temperature control. The liquid used will normally occupy all voids in the mill below the level of the balls or grinding elements within the mill and part of the mill above the level of the balls or grinding elements. A fully loaded mill will be approximately three quarters full.

The premilling step is generally carried out at a temperature of up to 65° C. The step of milling in the presence of an organic liquid can be carried out at from 10°–60° C. with from 20°–50° C. being the preferred range.

After the milling operations the resin extended pigment normally is extracted in a hot aqueous dilute acid, such as about 1.5% sulfuric acid, to remove any metal which has become associated with the resin extended pigment during milling. Following the extraction step, the pigment is dried. In conventional pigment processing, most particle aggregation occurs on drying. In the present process little or no aggregation occurs during the drying step due to the presence of the resin. In the case of the quinacridones, treatment of the product in the extraction step with 2-phthalimidomethylquinacridone improves the heat stability of the pigment. However, the treatment is optional and for a great many applications this treatment is unnecessary.

When extending a pigment with a resin of low polarity, such as polyethylene or polyethylene modified with acrylic acid to produce a product which is useful in plastic systems, the pigment coated by the resin, either in the premilling or subsequent milling operation, to some degree protects the pigment from the effect of the aqueous medium. This causes particle growth retardation, the extent of which retardation depends on the nature of the resin being used, thus yielding products of smaller particle size relative to products produced by a similar operation performed in the absence of resin. Notwithstanding the smaller particle size of some resin extended pigments prepared by the process of the present invention, these products are less agglomerated and more dispersible and consequently, their inherent strength and transparency is easier to realize in an end use system.

In processing of the resin extended pigments after an equilibrium particle size has been obtained, and the final acid extraction operation carried out, filtration and washing are exceptionally rapid due to the hydrophobic nature of the resin on the surface of the pigment particles affording economics in the essential pigment isolation step.

Organic pigments generally are suitable for use in the process of the present invention. Such pigments include the various copper phthalocyanines, including those polyhalogenated with chlorine and/or bromine, partially chlorinated alpha and chlorine free beta phase; alpha, beta and gamma quinacridone, as well as substituted quinacridones, such as 2,9-dimethylquinacridone, 2,9-dichloroquinacridone, 2,9-difluoroquinacridone, 4,11-dichloroquinacridone, 4,11-difluoroquinacridone and quinacridonequinone; solid solutions of two or more of the aforementioned quinacridones optionally with dihydroquinacridone such as described in U.S. Pat. No. 3,650,510; Indanthrone Blue; Flavanthrone; Thioindigo and some monoazo and disazo pigments.

The preferred quinacridones for use in the present invention have the formula:

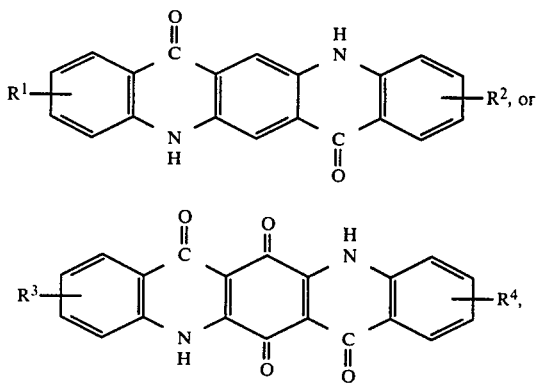

and solid solutions or mixtures, thereof with up to 15 weight percent of a quinacridone of the formula

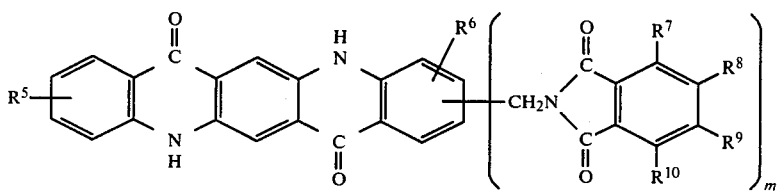

where $R^1$, $R^2$, $R^3$, $R^4$, $R^5$ and $R^6$ are hydrogen, fluorine, chlorine, bromine methyl or methoxy; $R^7$, $R^9$ and $R^{10}$ are hydrogen or chlorine and $R^8$ is hydrogen, chlorine, bromine, nitro, alkyl groups of 1–5 carbon atoms, alkoxy groups of or 2 carbon atoms or benzoylamino, and m is an integer of from 1–4.

Dispersibility in polyvinyl chloride, polyethylene or polypropylene of a 40% resin extended pigment such as copper phthalocyanine or a solid solution of 75% quinacricone and 25% 2,9-dimethylquinacridone, prepared by premilling and subsequent milling in basified water are significantly improved over the same pigment prepared in the absence of resin, showing greater strength and intensity, but just as importantly fewer or no specks or streaks. Clearly the presence of the resin is essential for obtaining the result described above.

The resin extended pigment of the present invention also improves the heat stability of some pigments which otherwise undergo partial or complete polymorphic changes or particle growth (depending on the nature of the pigment and the temperature) under the influence of heat when being incorporated with plastics such as high density polyethylene. For example, the red solid solution of 75% quinacridone and 25% 2,9-dimethylquinacridone prepared by a commercial process has a definite tendency to become progressively bluer at elevated processing temperatures due to partial phase conversion of any unsubstituted quinacridone, which is not in solid solution, to the violet beta-quinacridone crystal form. In the case of the resin extended pigment prepared by the process of the present invention, this change is significantly reduced. The improved thermal stability is readily apparent by examining the polyethylene chips processed between 400° and 600° F.

EXAMPLES

In the Examples all parts are by weight.

EXAMPLE 1

This Example describes the preparation of a 2,9-dimethylquinacridone/quinacridone solid solution extended with a copolymer resin.

A laboratory scale ball mill is charged with 3.3 parts of ½ inch (1.27 cm) diameter steel balls, 0.33 part roofing nails, 0.083 part of crude gamma quinacridone, 0.028 part of crude 2,9-dimethylquinacridone, 0.073 part of an ethylene/acrylic acid copolymer having a softening point of 108° C., a density of 0.93 g/cc, a Brookfield viscosity at 140° C. of 500 cps (0.5 Pas) an acid number of 40 mg KOH/g, and 0.018 part anhydrous sodium sulfate. The charge is milled at about 75% of the critical speed ("critical speed" is the speed at which centrifugal force overcomes the force of gravity so that the grinding elements are retained against the outer wall of the unit) of the mill for 96 hours, after which the contents of the mill are discharged through a screen which retains the steel balls and nails and the dry mill powder is recovered.

Another laboratory scale ball mill is then charged with 1.32 parts ⅛ inch (0.0032 m) diameter steel shot, 0.21 parts of water, 0.017 part 50% aqueous sodium hydroxide and 0.047 part of the mill powder obtained in the above described milling. The mill is rotated at about 75% of the critical speed for 72 hours. The contents of the mill are discharged onto a screen which retains the steel shot, and washed with sufficient additional water to collect all of the pigment slurry from the mill.

The basic slurry is stirred and acidified with dilute sulfuric acid to neutralize the sodium hydroxide and bring the pH to about 1.4–1.5. Steam is passed through the slurry until the temperature reaches 90° C. After holding at 90°±2° C. for one hour, a slurry of 0.0007 part of 2-phthalimidomethylquinacridone in 0.011 part water is added and heating continued for another hour. The product is isolated by filtration, washed free of acid with hot water, and dried at 80° C. The yield is 0.041 part of a bluish red powder.

The product is characterized by outstanding dispersibility in polyvinyl chloride when tested in the following manner. White plasticized soft polyvinyl chloride (0.0485 part) was mixed with 0.00044 part of the resin extended pigment, prepared as above, in a small glass jar by stirring with a spatula and subsequent rolling of the jar for one minute on a roller mill. The resulting mixture is added to 0.44 part of white plasticized soft polyvinyl chloride which has been softened by milling for 30 seconds on a two roll mill, the rolls of which are preheated to 150° C. and are rotating at 15 RPM. After 15 seconds of milling, the charge is given five alternate cuts, and the material removed from the mill. The removed material is allowed to cool and small exhibits are cut from the center of the resulting sheet. The remainder of the sheet is returned to the mill for an additional 10 alternate cuts and exhibits are similarly prepared. Dispersibility is judged by degree of color development and the degree of specking and streaking in the exhibit.

In terms of dispersibility, the product is dramatically superior to a pigment derived from a similarly dry milled combination of quinacridones in the absence of resin, followed by milling in dilute aqueous base in the presence of the same amount of the same resin.

EXAMPLE 2

This example describes the preparation of a 4,11-dichloroquinacridone/quinacridone solid solution extended with a copolymer resin.

A laboratory scale ball mill is charged with 3.3 parts of ½ (1.27 cm) diameter steel balls, 0.33 part roofing nails, 0.066 part of crude gamma quinacridone, 0.044 part of crude 4,11-dichloroquinacridone, 0.073 part of an ethylene/acrylic acid copolymer described in Example 1, and 0.018 part of anhydrous sodium sulfate. The charge is milled and the milled pigment isolated as described in example 1.

Another laboratory scale ball mill is then charged with 1.32 parts ⅛ inch (0.032 m) diameter steel shot, 0.21 part of water, 0.017 part 50% sodium hydroxide and 0.047 part of the mill powder obtained in the above described milling. The mill is rotated at about 75% of the critical speed for 72 hours. The contents of the mill are discharged and the extraction carried out exactly as described in Example 1. The yield of the resulting yellow shade red powder is 0.040 part.

The product exhibits excellent dispersibility in polyvinyl chloride and is vastly superior to a product of the same composition, prepared by dry milling in the absence of resin, but including the resin in the dilute aqueous alkali milling step.

EXAMPLE 3

This example describes the preparation of a resin extended copper phthalocyanine pigment.

A semi-works scale ball mill is charged with 30 parts of a crude semi-chlorinated copper phthalocyanine pigment containing 4.5% by weight chlorine (obtained by the reaction of 4-chlorophthalic acid and phthalic anhydride with urea and cuprous chloride) along with 20 parts of the ethylene/acrylic acid copolymer used in Example 1. The mill has previously been charged with 1000 parts of "Cyl-Pebs" [steel cylinders approximatly ½ inch (0.0127 cm) in diameter and ½ inch (0.0127 cm) in length] and 100 parts of "Twenty Penny" 4 inch (0.1m) long nails. To suppress the explosivity of the resulting powder, 5 parts of anhydrous sodium sulfate is also added. The mill is rotated at 74% of the critical speed for 15 hours, after which the contents of the mill is discharged through a screen which retains the "Cyl-Pebs" and nails. A portion of the resulting mill powder (0.047 part) is charged into a laboratory scale ball mill containing 1.32 parts ⅛ inch (0.0032 m) diameter steel shot, 0.21 part water, 0.017 part 50% aqueous sodium hydroxide. The mill is rotated for 72 hours at 75% of the critical speed. The mill is discharged on a screen which retains the steel shot using sufficient additional water to collect all of the pigment slurry from the mill. The basic slurry is stirred and acidified with dilute sulfuric acid to neutralize the sodium hydroxide and bring the pH to about 1.4-1.5. Steam is passed through the slurry until the temperature reaches 85° C. After holding at 85°±2° C. for two hours, the product is isolated by filtration. It is washed free of acid with hot water and dried at 80° C. The yield is 0.04 part of a dark bluish powder.

The product is characterized by excellent dispersibility in low density polyethylene when tested in the following manner: Film grade low density polyethylene (0.386 part) is added to a two roll mill having two six inch (0.15 m) rolls which are rotated at surface speeds of 35 and 45 feet per minute (10.7 and 13.7 meters per minute), respectively and are heated to 60° C. and 120° C. respectively. When the low density polyethylene has softened, a previously prepared hand stirred mixture of 0.055 part of powdered low density polyethylene and 0.0022 part (on a toner basis) of the resin extended pigment prepared above is added and the material thoroughly incorporated by milling for 50-60 seconds. The charge is given 5 alternate cuts and the material is taken off the mill, allowed to cool and small exhibits (3 inch by 4 inch) (0.076 m by 0.1 m) are cut from the center of the resulting sheet. The remainder of the sheet is returned to the mill for an additional 5 alternate cuts and an exhibit cut out. The same is repeated for 15 and 20 total cuts. The exhibits are separately pressed in a 3 inch by 5 inch (0.0762 m by 0.127 m), 20 mil (0.0005 m) mold at 174° C. using polyethylene terephthalate film between the low density polyethylene and the metal of the mold. The pressed material is cooled before the film is removed. The resulting exhibits are visually examined under a microscope. The pigment is completely dispersed showing no appreciable amounts of visible particles and is comparable to a commercial resin extended pigment prepared by a different post particle size processing method.

A product prepared in a similar manner, but with a pigment which has not been resin extended, shows large undispersed pigment aggregates.

The pigment can also be evaluated by determining the tinctorial strength of the pigment when dispersed in low density polyethylene. Low density polyethylene (0.44 part) is added to the two roll mill with the front roll heated to 138° C. and the rear roll to 121° C., rotating respectively at 45 and 35 feet per minute (13.7 and 10.7 meters per minute) respectively. When the low density polyethylene has softened 0.017 part of a 50/50 low density polyethylene/white titanium dioxide pigment, concentrate is added and given 5 alternate cuts to incorporate the white pigment. Then 0.00044 part (on a toner basis) of the pigment, prepared as above, is added and the material thoroughly incorporated for about one minute. Then the charge is given five alternate cuts and a center sample taken as described above followed by 10, 15, and 20 alternate cuts with a center sample being taken each time. Three inch by 5 inch (0.072 m by 0.127 m) by 20 mil (0.0005 m) exhibits are pressed in a mold and the color strength compared. The tinctorial strength exhibited by the pigment is comparable to that of a commercial resin extended pigment. When the milling steps are repeated as described above but the resin is left out from the dry milling step, a product is obtained which shows significantly poorer dispersibility in polyethylene when tested by the above described procedure.

I claim:

1. A process comprising dry milling a crude organic pigment to a low-crystallinity state in the presence of from 10 to 75% by weight based on pigment of a water-insoluble thermoplastic resin followed by milling the thus obtained product in water at pH 7–14.

2. The process of claim 1 wherein the aqueous milling step is carried out at pH 9–13.5.

3. The process of claim 2 wherein the pigment is quinacridone or a derivative thereof or a solid solution of two or more quinacridones or quinacridone derivates or copper phthalocyanine, or a partially or completely halogenated copper phthalocyanine.

4. The process of claim 3 wherein the resin is a polymer of ethylene containing up to 25% of a monomer selected from the class consisting of acrylic acid, methacrylic acid, vinyl acetate and oxidized ethylene units.

5. The process of claim 4 wherein the resin has a softening point of from 80°–140° C. as determined by ASTM E-28.

6. The process of claim 5 wherein the pigment is copper phthalocyanine or a halogenated copper phthalocyanine.

7. The process of claim 5 wherein the pigment consists essentially of a quinacridone or quinacridone of the formula

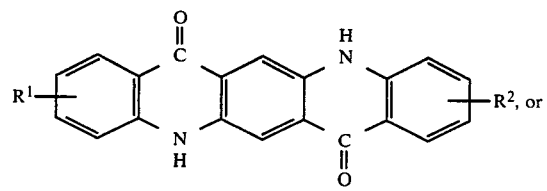

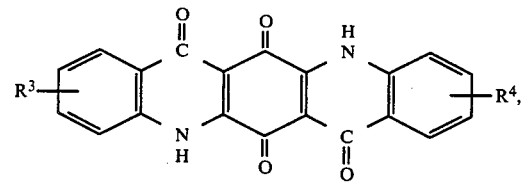

and solid solutions or mixtures thereof, and up to 15 weight percent of a quinacridone of the formula

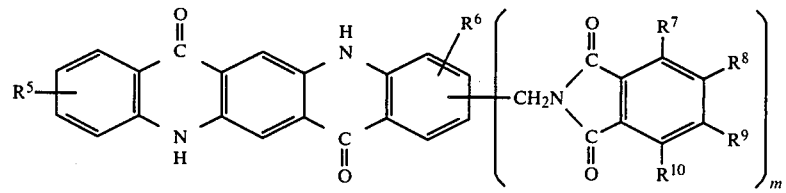

where $R^1$, $R^2$, $R^3$, $R^4$, $R^5$ and $R^6$ are hydrogen, fluorine, chlorine, bromine methyl or methoxy; $R^7$, $R^9$ and $R^{10}$ are hydrogen or chlorine and $R^8$ is hydrogen, chlorine, bromine, nitro, alkyl groups of 1–5 carbon atroms, alkoxy groups of or 2 carbon atoms or benzoylamino, and m is an integer of from 1–4.

8. The process of claim 7 wherein the quinacridone is a solid solution consisting essentially of 2,9-dimethylquinacridone, quinacridone, and up to 5% by weight phthalimidomethylquinacridone.

9. The process of claim 7 wherein the quinacridone is a solid soluiton consisting essentially of 4,11-dichloroquinacridone, quinacridone and up to 5% phthalimidomethylquinacridone.

* * * * *